(12) United States Patent
Kwon

(10) Patent No.: US 9,100,543 B2
(45) Date of Patent: Aug. 4, 2015

(54) METHOD AND SYSTEM FOR CONTROLLING VIDEO STRUCTURE OF VIDEO CONFERENCE SYSTEM

(76) Inventor: Ki Hoon Kwon, Gyeongsangbuk-do (KR)

( * ) Notice: Subject to any disclaimer, the term of this patent is extended or adjusted under 35 U.S.C. 154(b) by 98 days.

(21) Appl. No.: 14/112,391

(22) PCT Filed: Mar. 30, 2012

(86) PCT No.: PCT/KR2012/002347
§ 371 (c)(1),
(2), (4) Date: Nov. 5, 2013

(87) PCT Pub. No.: WO2012/144751
PCT Pub. Date: Oct. 26, 2012

(65) Prior Publication Data
US 2014/0184728 A1    Jul. 3, 2014

(30) Foreign Application Priority Data

Apr. 22, 2011    (KR) .................. 10-2011-0038078

(51) Int. Cl.
*H04N 7/14*    (2006.01)
*H04N 7/15*    (2006.01)
*H04L 29/06*    (2006.01)
*H04L 12/18*    (2006.01)

(52) U.S. Cl.
CPC .............. *H04N 7/15* (2013.01); *H04L 12/1827* (2013.01); *H04L 65/4038* (2013.01); *H04L 65/602* (2013.01); *H04L 65/80* (2013.01); *H04N 7/147* (2013.01)

(58) Field of Classification Search
CPC ....................................... H04N 7/14
USPC .......... 348/14.01, 14.07, 14.09, 14.12, 14.13, 348/14.08
See application file for complete search history.

(56) References Cited

U.S. PATENT DOCUMENTS

2006/0244812 A1* 11/2006 Jeong et al. .................. 348/14.1
2009/0015717 A1*  1/2009 Arnao et al. .................. 348/581

FOREIGN PATENT DOCUMENTS

| KR | 10-2005-0082507 A | 8/2005 |
| KR | 10-2009-0029454 A | 3/2009 |
| KR | 10-2011-0007397 A | 1/2011 |

OTHER PUBLICATIONS

International Searching Authority International Search Report for PCT/KR2012/002347 dated Oct. 12, 2012.

* cited by examiner

*Primary Examiner* — Olisa Anwah
(74) *Attorney, Agent, or Firm* — Sughrue Mion, PLLC

(57) ABSTRACT

Disclosed is a method and system for allowing a server system to control a video structure of a client system through a video of an optimized size and to transmit the controlled video structure in a system in which video conference is remotely available. The method includes a step of allowing a control unit of any one client system to request a main control unit of a server system to change the video structure which includes coordinates and video size; and allowing the main control unit to make a change so as to coincide with the request of the control unit of the client system, which has requested the change of the video structure being currently outputted to a video conference monitor, and to transmit the change to a control unit of each client system.

5 Claims, 4 Drawing Sheets (a)

(b)

(c)

(d)

(e)

(f)

(g)

METHOD AND SYSTEM FOR CONTROLLING VIDEO STRUCTURE OF VIDEO CONFERENCE SYSTEM

CROSS REFERENCE TO RELATED APPLICATIONS

This application is a National Stage of International Application No. PCT/KR2012/002347 filed Mar. 30, 2012, claiming priority based on Korean Patent Application No. 10-2011-0038078 filed Apr. 22, 2011, the contents of all of which are incorporated herein by reference in their entirety.

TECHNICAL FIELD

The present invention relates to a method and a system for adjusting a video structure in a video conference system, and more particularly, to a method and a system for adjusting a video structure of a client system by a server system to obtain a video of an optimized size and transmitting it in a system configured for remote video conferencing.

BACKGROUND ART

In general, a video conference system refers to a system enabling people to conduct a conference at a long distance from each other through videos, audios, and the like delivered on monitor screens installed at respective rooms. Video conferencing can not only be conducted domestically but also internationally via satellites, and thus is regarded as cutting-edge technology of great economical merits such as saving costs and time for business travels. A video conference room can be equipped with a number of monitors, TV sets, cameras, microphones, and speakers, as well as electronic blackboards configured to display manually-inputted information to others as it appears, image transmitters, slide transmitters, facsimiles, and the like.

Such a system has a problem in that conference participants, who are joining a conference at a distance, are likely to feel remoteness, and thus requires a device for video and audio coordination so that the participants can feel as if they are in the same space.

Video conference systems have a series of standards recommended by ITU-T (International Telecommunication Union; Telecommunication Standardization Sector), and products have recently appeared which realize conferencing through monitors on personal computers. Conferencing through monitors has an added function for conducting tasks by sharing data composed by personal computers. Data sharing functions include a whiteboard function for displaying an electronic bulletin board on monitor screens of both sides, a function for sharing and using the same application software, and the like. A video conference system using the Internet also has appeared recently. Such a video conference system using the Internet can save movement time taken to join a conference, thereby guaranteeing efficient use of time; it can save relevant costs; it can improve productivity; and it can store video information regarding conference proceedings. There are also provided devices for remote diagnosis or remote education by applying these.

In a conventional video conference system, the server or MCU (Main Control Unit) is configured to receive video signals from a plurality of client systems and remake them into a single video. The size of videos transmitted from the client systems remains the same as initially determined, regardless of the number of persons in conference rooms, until the conference ends, and the server (MCU) changes it to a suitable size through resizing after respective videos are received from the plurality of client systems.

Therefore, it is recommended that, every time the size of videos received from the client systems is changed, the server can change the size, however, this has the following problems: a long initialization time is taken to change the video size, and, if initialization occurs for each video size change, videos are not transmitted for hundreds of milliseconds at minimum, or for more than one seconds at maximum, giving blank screens.

As such, the conventional method of adjusting the video size through initialization is inefficient in that, if a number of client systems transmit video signals simultaneously, the bandwidth of the server increases, it takes an increased time for the server to decode many video signals, and it takes an increased time for the server to adjust the video size.

SUMMARY OF INVENTION

Technical Problem

The present invention has been made to solve the above-mentioned problems, and it is an object of the present invention to guarantee that, when a client system requires a change of the video structure, the server (MCU) system transmits information regarding the video structure to each client system in advance so that each client system changes the video signal to the most suitable size and then transmit it to the server system.

It is another object of the present invention to transmit a video signal, which has been changed through optimization, from the server system to a client system so that it can be monitored.

It is another object of the present invention to reduce the transmission/reception bandwidth of the client system and the server system and to reduce time needed for decoding and resizing by the server system.

Solution to Problem

In order to accomplish the above-mentioned objects, a method for adjusting a video structure of a video conference system according to the present invention includes: (a) sending a request for change of a video structure including a video size and a coordinate from a control unit of a client system to a main control unit of a server system; (b) making a change, by the main control unit, in conformity with the request of the client system control unit, which has requested change of the video structure currently output to a video conference monitor, and making a transmission to each client system control unit; (c) changing the video size of a resizing unit by the control unit and initializing an encoding unit; (d) transmitting a video signal, which has been changed by the encoding unit, to the server system via a transmission/reception unit by the control unit; (e) initializing a decoding module, by the main control unit of the server system, and decoding a received video signal; and (f) outputting, by the main control unit, a video to the video conference monitor via a rendering module based on the changed video structure, wherein the main control unit controls so that, according to connection of a plurality of client systems and a request for change of the video structure, the video size is changed by a resizing unit of a client system and is used to output changed videos to the video conference monitor of the server system and monitors of the client systems.

The method may further include: (g) compressing, by the main control unit, videos output through the video conference monitor and transmitting videos encoded by the encoding module to a plurality of client systems; and (h) decoding and rendering, by respective client systems, video signals received from the server system and outputting videos to the monitors.

When a new client system is connected, the main control unit may not transmit a video size and a coordinate regarding a vide structure to the new client system, but make a change to a video structure set by the main control unit.

According to the number of connected client systems, the main control unit may reduce and change a video structure displayed on the video conference monitor to 1/n (n refers to the number of client systems connected to the server system).

Furthermore, a system for adjusting a video structure of a video conference system according to the present invention includes: a plurality of client systems including video acquisition units configured to convert videos acquired through imaging into video signals, resizing units configured to convert video signals of the video acquisition units to a preset video size, encoding units configured to encode the converted video signals, transmission/reception units configured to output the encoded video signals to a server system or receive control signals or compressed video signals from the server system, decoding units configured to decode encoded video signals received from the server system via the transmission/reception units, rendering units configured to create videos to be displayed from the decoded video signals, monitors configured to visually display videos using video signals output from the rendering units, and control units configured to change the size of output videos by the resizing units, initialize the encoding units, and control input/output data of the transmission/reception units; and a server system including one or a plurality of client signal processing units including a transmission/reception module configured to output the encoded and compressed video signals to the client systems or receive video signals from the client systems, a decoding module configured to decode video signals received from the client systems, a rendering module configured to create videos to be displayed from the decoded video signals, and an encoding module configured to encode the videos created by the rendering module, and a main control unit configured to output control signals for changing the size of output videos to the client systems, compress/process videos output from the rendering module, initialize the decoding module, control a video structure output from the rendering module to a video screen monitor, and control input/output data of the transmission/reception units.

Advantageous Effects of Invention

The present invention improves the reliability of a video conference system, by means of the above-mentioned solution to problem, by resizing a video, which has been acquired by a client system, to a size most suited to its monitor and transmitting the video to the server system, thereby saving costs for a network between the client system and the server system, improving efficiency through reduction of operations for decoding and resizing by the server system, and enabling a video conference of higher video quality through optimized videos.

DESCRIPTION OF EMBODIMENTS

Hereinafter, a method and a system for adjusting the video structure of a video conference system according to the present invention will be described in detail with reference to the accompanying drawings.

Figure 1:
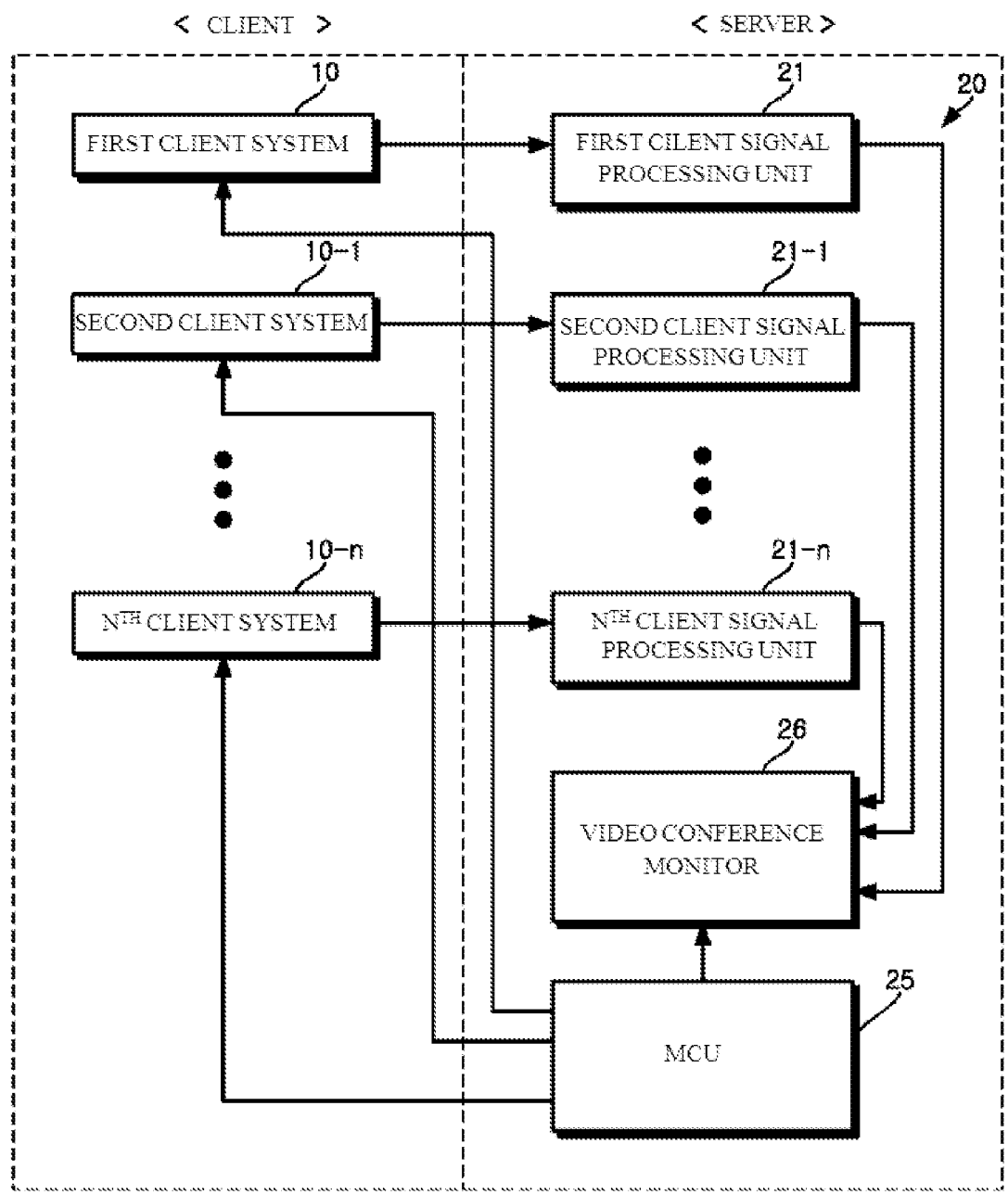
FIG. 1 is a block diagram illustrating a system for adjusting the video structure of a video conference system according to the present invention.

Referring to FIG. 1, the video conference system is structured so that a plurality of clients is connected to a single server via a wired/wireless communication network. The server is configured to collect video signals from the plurality of clients, output them to a monitor, and transmit all videos collected from respective clients.

The client systems 10~10-$n$ are supposed to be constructed by clients who want a video conference. The client systems 10~10-$n$ can include personal computers equipped with imaging devices, such as webcams or camcorders, mobile communication terminals, and the like. Furthermore, the client systems are preferably provided with software necessary for video conferencing.

Figure 2:
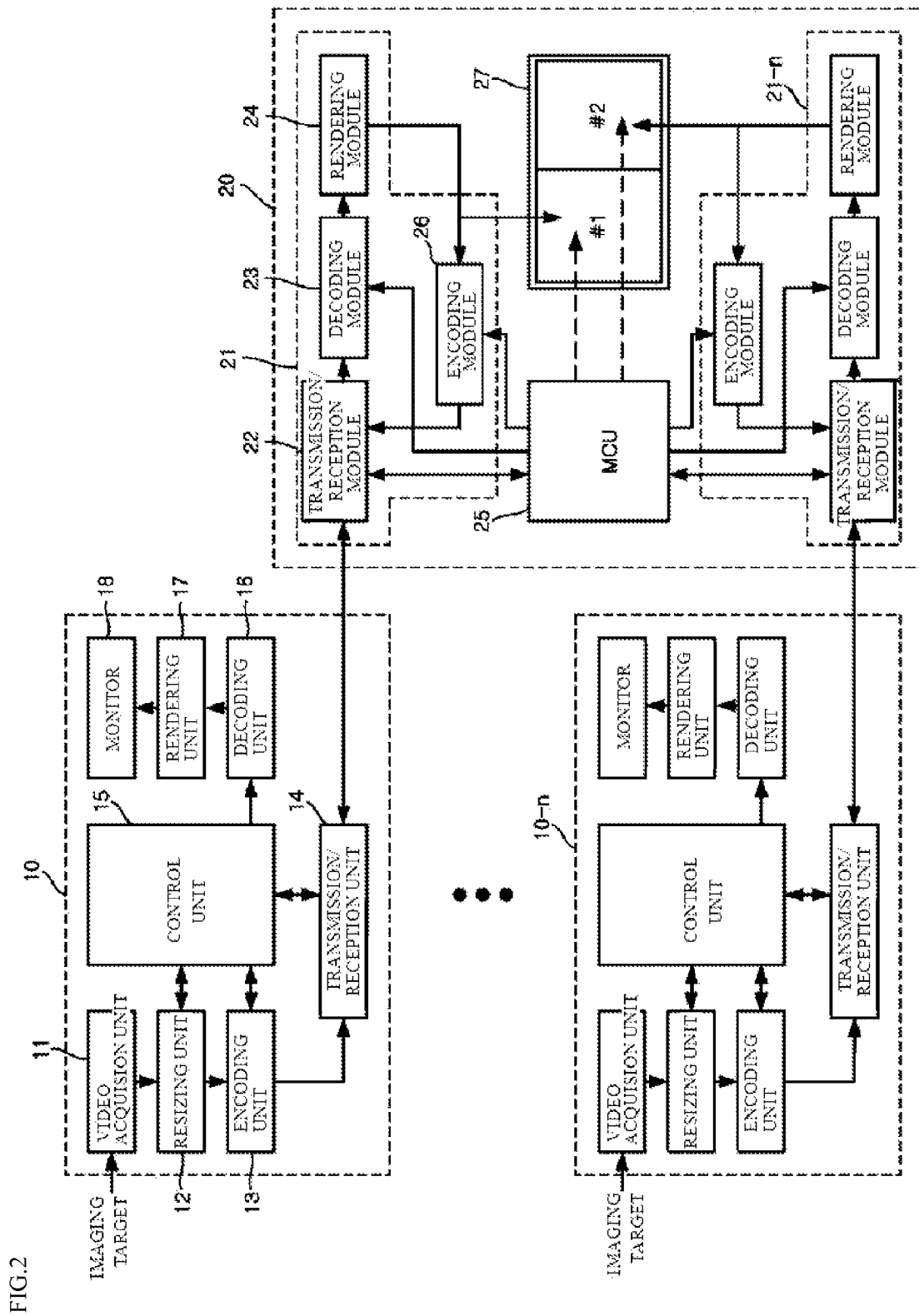
FIG. 2 is a block diagram illustrating an embodiment of a system for adjusting the video structure of a video conference system according to the present invention.

Referring to FIG. 2, the client systems 10~10-$n$ include video acquisition units 11 configured to convert videos acquired through imaging into video signals. The video acquisition units 11 are configured to take images of imaging targets, i.e. those who want to participate in a video conference, convert them into video signals, and output them. Resizing units 12 are configured to convert video signals, which have been converted by the video acquisition units 11, to a preset video size. That is, the resizing units 12 reconvert video signals to a predetermined video size. When the size of videos converted by the video acquisition units 11 is 1280*720, for example, the resizing units 12 reduce it to 1/n, n being the total number of client systems 10~10-$n$ connected to the server system 20. Specifically, when the number of client systems 10~10-$n$ is forty, a video size of 1280*720 is reduced to 256*180.

Encoding units 13 are configured to encode the converted video signals. Transmission/reception units 14 are configured to output the video signals, which have been encoded by the encoding units 13, to the server system 20 or receive control signals or compressed video signals from the server system 20. Decoding units 16 are configured to decode the encoded video signals, which are received from the server system 20 via the transmission/reception units 14, and rendering units 17 are configured to create videos, which are to be displayed on monitors 18, from the decoded video signals. The monitors 18 are configured to visually display videos based on video signals output from the rendering units 17 and are integrated with the client systems 10~10-$n$ or provided separately. The client systems 10~10-$n$ also include control units 15 configured to change the size of output videos using the resizing units 12, initialize the encoding units 13, or control input/output data of the transmission/reception units 14.

The server system 20 is provided with one or a plurality of client signal processing units 21~21-$n$. The client signal processing units 21~21-$n$ are configured to output video signals, which are input from the client systems 10~10-$n$, to a video conference monitor 27 or transmit the same videos to respective client systems 10~10-n as output to the video conference monitor 27. Therefore, a plurality of client signal processing units 21~21-n can be provided so as to correspond to the plurality of client systems 10~10-n, or a single client signal processing unit 21~21-n can be used to input/output or process video signal data of the plurality of client systems 10~10-n.

The client signal processing units 21~21-n include transmission/reception modules 22 configured to output encoded and compressed video signals to the client systems 10~10-n or receive video signals from the client systems 10~10-n. Decoding modules 23 are configured to decode video signals received from the client systems 10~10-n, and rendering modules 24 are configured to create videos, which are to be displayed on the video conference monitor 27, from the decoded video signals. The client signal processing units 21~21-n also include encoding modules 26 configured to encode videos created by the rendering modules 24.

The server system 20 has a MCU 25 configured to output control signals to the client systems 10~10-n to change the size of output videos, compress/process videos output from the rendering modules 24, initialize the decoding modules 23, control the structure of videos output from the rendering modules 24 to the video conference monitor 27, or control input/output data of the transmission/reception modules 22. The MCU 25 can be a microcomputer, a microprocessor, or the like.

Figure 3:
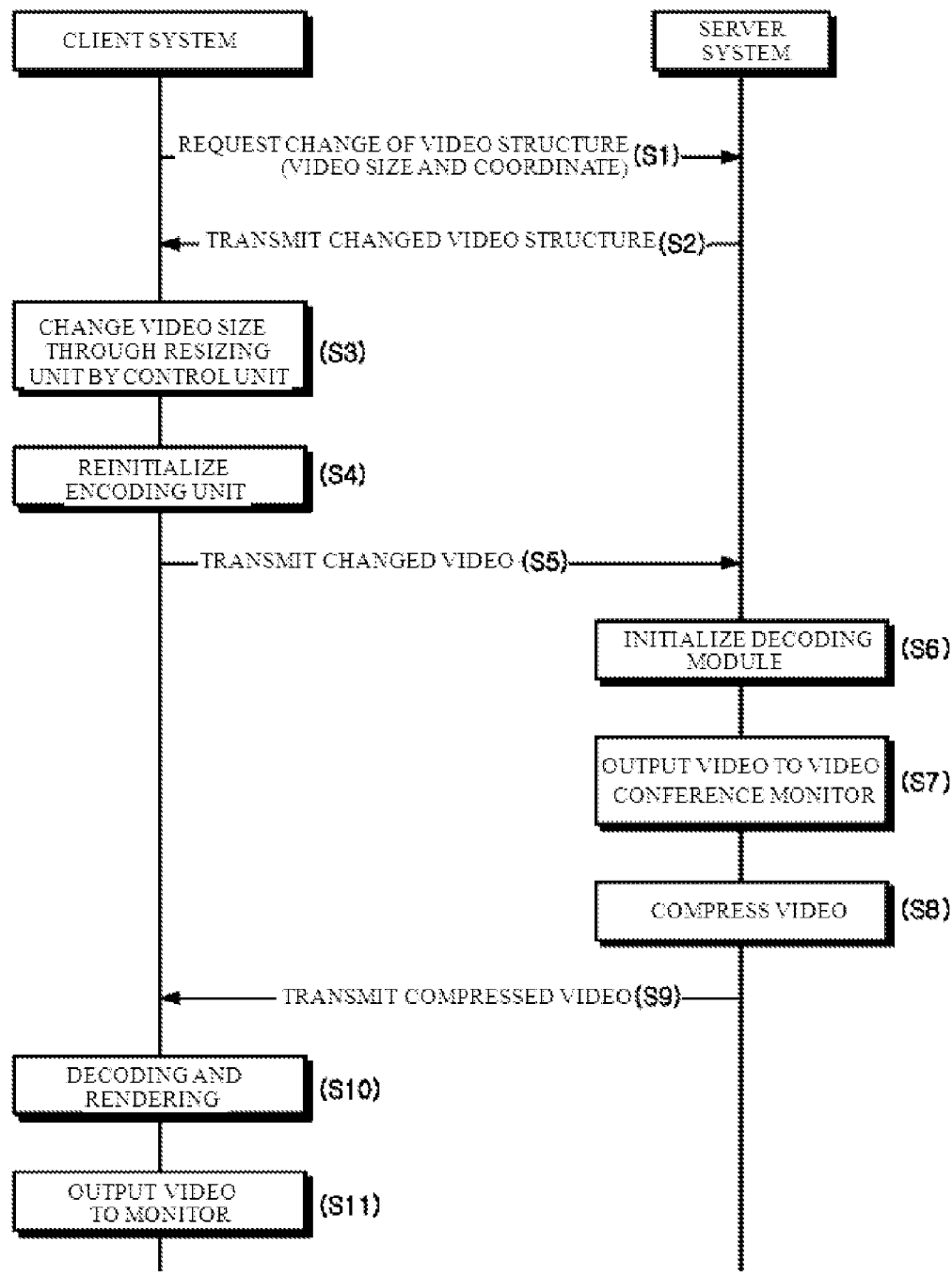
FIG. 3 is a flowchart illustrating a method for adjusting the video structure of a video conference system according to the present invention.

A method for adjusting the video structure by a video conference system according to the present invention, which is configured as described above, will now be described with reference to the flowchart of FIG. 3.

Firstly, when the video mode of the video conference monitor 27 is changed by the server system 20 or when a new client system is connected to the server system and starts transmission of a video, the MCU 25 transmits a control signal regarding a change of the video structure, i.e. video size and coordinate, to each client system. At this time, the encoding units and decoding units of the client systems, as well as the encoding modules and decoding modules of the server system, are initialized, respectively.

The control unit 15 of a client system 10~10-n, which is connected to the server system 20, requests the MCU 25 of the server system 20 to change the video structure, i.e. video size and coordinate (S1). The MCU 25 changes the video structure so as to conform to the request of the control unit 15 of the client system 10~10-n, which has requested a change of the structure of videos currently output to the video conference monitor 27, and transmits it to the control unit 15 of each client system 10~10-n (S2). The video size corresponds to a video signal, the size of which has been adjusted in advance, and which is to be transmitted from the client systems 10~10-n to the server system 20, and the coordinate is used to determine the position of a plurality of videos of the corresponding client systems 10~10-n, which are to be displayed on the video conference monitor 27.

Based on the control signal regarding the video structure transmitted from the MCU 25, the control unit 15 causes the resizing unit 12 to change the video size of video signals input from the video acquisition unit 11 (S3), and initializes the encoding unit 13 (S4). The change of video size corresponds to reduction of the size of video signals, which have been input from the video acquisition unit 11 at a predetermined size, in advance so that the size of video signal data is reduced. For example, when the video acquisition unit 11 acquires a video of the imaging target at a resolution of 1280*720, the resizing unit 12 reduces the video size to a resolution of 256*180.

The control unit 15 of the client system 10~10-n causes the video signal, the video size of which has been changed by the resizing unit 12, to be encoded by the encoding unit 13 and transmitted to the server system 20 via the transmission/reception unit 14 (S5). When the server system 20 receives the video signal from the client system 10~10-n, the MCU 25 of the server system 20 initializes the decoding module 23 and causes it to decode the received video signal (S6). The MCU 25 then causes videos to be output to the video conference monitor 27 via the rendering module 24 based on the changed video structure (S7). At this time, the MCU 25 assigns each video of the corresponding client system 10~10-n to the video conference monitor 27 according to the preset size and coordinate so as to be displayed at the corresponding location.

As such, the MCU 25 controls in such a manner that, according to connection of a plurality of client systems 10~10-n and a request for change of the video structure, the video size changed by the resizing unit 12 of a client system 10~10-n is used to output changed videos to the video conference monitor 27 of the server system 20 and the monitors 18 of the client systems 10~10-n.

Transmission of videos from the server system 20 to the client systems 10~10-n is as follows: videos output through the video conference monitor 27 is compressed by the MCU 25 (S8), and videos encoded by the encoding modules 26 are transmitted to the plurality of client systems 10~10-n (S9). Respective client systems 10~10-n decode and render the video signals received from the server system 20 (S10), and cause the videos to be output to the monitors 18 (S11).

When a new client system 10~10-n is connected, the MCU 25 of the server system 20 may not transmit a video size and a coordinate, which are related to the video structure, to the new client system, but make a change to a video structure set by the MCU 25. In other words, in the case of connection of a predetermined number of client systems 10~10-n, the MCU 25 of the server system 20 does not transmit separate control signals for changing the video structure, but make a change to the preset video structure. Therefore, when the server system 20 and a plurality of client systems 10~10-n start a connection for video conferencing, the MCU 25 outputs control signals regarding a change of the video structure to the control units 15; however, in the case of a client system 10~10-n newly connected during the video conference, the MCU 25 can change the video structure based on standards set by the MCU 25.

Figure 4:
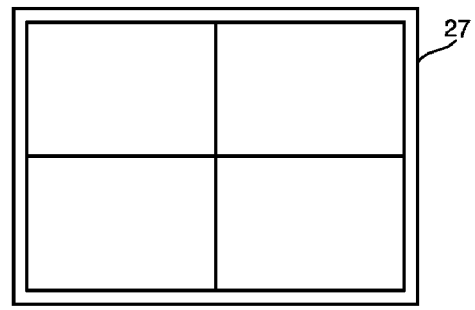
FIG. 4 is a diagram illustrating various embodiments of displaying videos, the size of which has been adjusted by a video conference system according to the present invention, on monitors.
Figure 4:
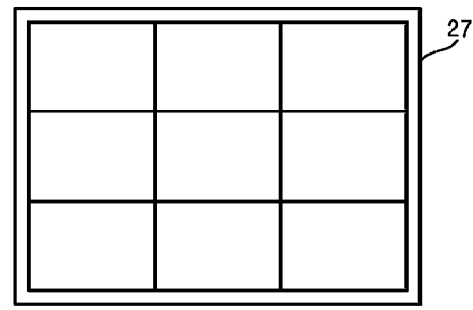
Figure 4:
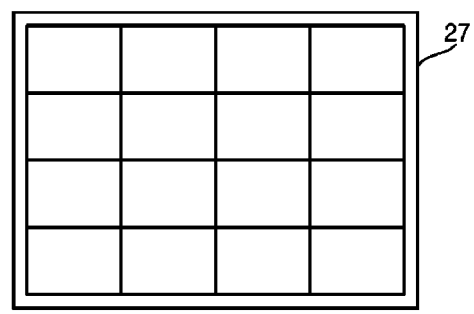
Figure 4:
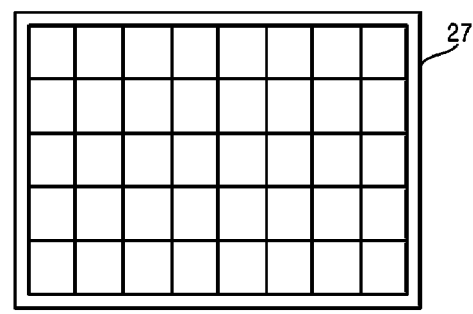
Figure 4:
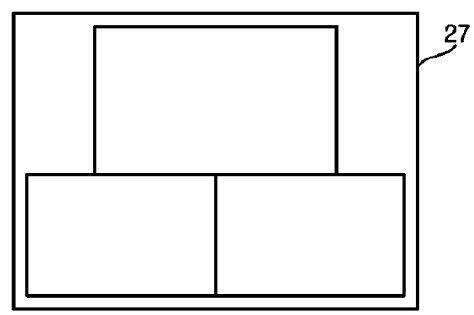
Figure 4:
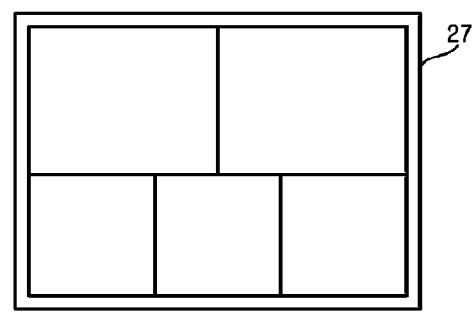
Figure 4:
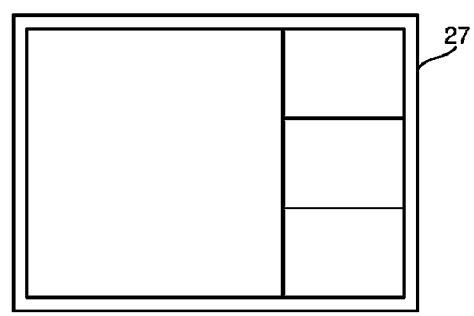

Referring to FIG. 4, the MCU 25 can automatically change the structure of videos displayed on the video conference monitor 27 according to the number of connected client systems 10~10-n. This is for the purpose of maximizing utilization of the video conference monitor 27. In other words, when a small number of client systems 10~10-n are connected to the server system 20, the size of videos displayed on the video conference monitor 27 is adjusted according to the number of client systems 10~10-n so that conference participants are provided with videos of more reasonable sizes. FIG. 4A illustrates a connection of a server system 20 and four client systems 10~10-n; FIG. 4B illustrates a connection of nine client systems 10~10-n to a single server system 20; FIG. 4C illustrates a connection of sixteen client systems 10~10-n to a single server system 20; and FIG. 4D illustrates a connection of forty client systems 10~10-n to a single server system 20. However, more than forty client systems 10~10-n can also be connected to a single server system 20. Furthermore, FIG. 4E illustrates a connection of three client systems 10~10-n to a single server system 20, wherein the video of a specific client system 10~10-n is displayed on the main screen, the others on the auxiliary screen. FIG. 4F illustrates a connection of five client systems 10~10-n to a single server system 20, wherein videos of the two client systems 10~10-n are displayed on the main screen, the others on the auxiliary screen. FIG. 4G illustrates a connection of four client systems 10~10-n to a single server system 20, wherein the video of a specific client system 10~10-n is displayed on the main screen, the others on the auxiliary screen. It is also possible to vary the arrangement, size, and the like of the client systems 10~10-n according to the video quality, size, and the like of the video conference monitor 27.

Meanwhile, the MCU 25 consists of hardware and is supposed to conduct a large amount of operations. The MCU 25 according to the present invention is basically configured to decode and resize videos of the client systems 10~10-n and mix and encode videos of respective client systems 10~10-n. The MCU 25 conducts fast operations but, as more client systems 10~10-n transmit videos to the server system 20, it fails to exhibit operation capacity sufficient to provide a video conference of high video quality, i.e. of high resolution. Therefore, in order to reduce the operation loads on the MCU 25 of the server system 20, the size of videos finally mixed by the MCU 25 and displayed does not change even if more than a predetermined number of client systems 10~10-n are connected. Inversely, as more client systems 10~10-n transmit videos, decoding time and resizing time increase exponentially, causing relatively smaller videos assigned to respective client systems 10~10-n. Therefore, in order to solve problems occurring when videos of initially set sizes are transmitted continuously as in the prior art, the present invention proposes that the server system 20 transmits control signals regarding the video structure to the client systems 10~10-n in advance so that the video size is changed in real time, thereby minimizing excessive loads on the server system 20.

The video conference system according to the present invention can be variously used for video conferencing of high video quality for general companies, educational and medical purposes, and the like, at a low cost, by applying software for control regarding video structure change to a relatively-inexpensive hardware configuration, which can conduct the same function.

An example of application of the present invention is as follows: assuming that forty client systems 10~10-n are connected to a single server system 20, when the size of videos output by the client systems 10~10-n is 1280*720, the output bandwidth of the server is 2 Mbps. If the size of videos output by the client systems 10~10-n is reduced by a factor of 1/40 to 256*180, videos of the same quality can be realized even when the output bandwidth of the client systems 10~10-n is below 200 Kbps. According to the prior art, the server system 20 has a reception bandwidth of 2 Mbps and requires a bandwidth of 80 Mbps in the case of forty client systems 10~10-n; however, the present invention can reduce the bandwidth to 200 Kbps*40=8 Mbps. Furthermore, the prior art requires that the decoding resource of the server system 20 decode forty videos of 1280*720, but the present invention decodes forty videos of 256*180; the prior art requires that the server resize resource change forty from 1280*720 to 256*180, but the present invention needs not perform any resize resource.

Therefore, according to the number of connected client systems 10~10-n, the MCU 25 can reduce and change the video structure displayed on the video conference monitor 27 to 1/n, n being the number of client systems connected to the server system.

As such, the present invention is advantageous in that transmission of videos, which have been resized and trimmed by client systems 10~10-n to a size most suited to the video mode of video conference monitor, saves costs of the server network, minimizes operations for decoding or resizing by the server, and thus further improves efficiency.

It is obvious to those skilled in the art that, although the present invention has been illustrated and described above with reference to specific embodiments, various modifications and changes can be made without escaping from the idea and scope of the present invention as defined by the following claims.

INDUSTRIAL APPLICABILITY

The method and system for adjusting the video structure of a video conference system according to the present invention is industrially applicable in that costs for a network between the client systems and the server system are saved; efficiency is improved by reducing operations for decoding and resizing by the server system; and video conferencing of higher video quality is made possible by optimized videos, thereby improving reliability of the video conference system.

The invention claimed is:

1. A method for adjusting a video structure of a video conference system, the method comprising:
  (a) sending a request for change of a video structure comprising a video size and a coordinate from a control unit of a client system to a main control unit of a server system;
  (b) making a change, by the main control unit, in conformity with the request of the client system control unit, which has requested change of the video structure currently output to a video conference monitor, and making a transmission to each client system control unit;
  (c) changing the video size of a resizing unit by the control unit and initializing an encoding unit;
  (d) transmitting a video signal, which has been changed by the encoding unit, to the server system via a transmission/reception unit by the control unit;
  (e) initializing a decoding module, by the main control unit of the server system, and decoding a received video signal; and
  (f) outputting, by the main control unit, a video to the video conference monitor via a rendering module based on the changed video structure,
  wherein the main control unit controls so that, according to connection of a plurality of client systems and a request for change of the video structure, the video size is changed by a resizing unit of a client system and is used to output changed videos to the video conference monitor of the server system and monitors of the client systems.

2. The method of claim 1, further comprising:
  (g) compressing, by the main control unit, videos output through the video conference monitor and transmitting videos encoded by the encoding module to a plurality of client systems; and
  (h) decoding and rendering, by respective client systems, video signals received from the server system and outputting videos to the monitors.

3. The method of claim 1, wherein, when a new client system is connected, the main control unit does not transmit a video size and a coordinate regarding a vide structure to the new client system, but makes a change to a video structure set by the main control unit.

4. The method of claim 1, wherein, according to the number of connected client systems, the main control unit reduces and changes a video structure displayed on the video conference monitor to 1/n (n refers to the number of client systems connected to the server system).

5. A system for adjusting a video structure of a video conference system, comprising:

a plurality of client systems comprising video acquisition units configured to convert videos acquired through imaging into video signals, resizing units configured to convert video signals of the video acquisition units to a preset video size, encoding units configured to encode the converted video signals, transmission/reception units configured to output the encoded video signals to a server system or receive control signals or compressed video signals from the server system, decoding units configured to decode encoded video signals received from the server system via the transmission/reception units, rendering units configured to create videos to be displayed from the decoded video signals, monitors configured to visually display videos using video signals output from the rendering units, and control units configured to change the size of output videos by the resizing units, initialize the encoding units, and control input/output data of the transmission/reception units; and a server system comprising one or a plurality of client signal processing units comprising a transmission/reception module configured to output the encoded and compressed video signals to the client systems or receive video signals from the client systems, a decoding module configured to decode video signals received from the client systems, a rendering module configured to create videos to be displayed from the decoded video signals, and an encoding module configured to encode the videos created by the rendering module, and a main control unit configured to output control signals for changing the size of output videos to the client systems, compress/process videos output from the rendering module, initialize the decoding module, control a video structure output from the rendering module to a video screen monitor, and control input/output data of the transmission/reception units.

* * * * *